(12) United States Patent
Schatz et al.

(10) Patent No.: US 12,644,468 B2
(45) Date of Patent: Jun. 2, 2026

(54) FAN WHEEL

(71) Applicant: MAHLE International GmbH, Stuttgart (DE)

(72) Inventors: Markus Schatz, Fellbach (DE); Stefan Schmidgall, Stuttgart (DE); Uwe Aschermann, Karlsruhe (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 19/340,258

(22) Filed: Sep. 25, 2025

(65) Prior Publication Data

US 2026/0085697 A1 Mar. 26, 2026

(30) Foreign Application Priority Data

Sep. 26, 2024 (DE) .......................... 102024127886.2

(51) Int. Cl.
| | |
|---|---|
| *F04D 29/38* | (2006.01) |
| *F04D 29/66* | (2006.01) |
| *B60H 1/00* | (2006.01) |

(52) U.S. Cl.
CPC ......... F04D 29/384 (2013.01); F04D 29/663 (2013.01); *B60H 1/00464* (2013.01)

(58) Field of Classification Search
CPC ...... F04D 29/38; F04D 29/384; F04D 29/663; F04D 29/66; B60H 1/00464
See application file for complete search history.

(56) References Cited

U.S. PATENT DOCUMENTS

| | | | | |
|---|---|---|---|---|
| 5,769,607 | A | * 6/1998 | Neely | F04D 29/326 |
| | | | | 416/189 |
| 6,431,498 | B1 * | 8/2002 | Watts | B64C 3/28 |
| | | | | 244/200 |
| 11,560,796 | B2 * | 1/2023 | Gea Aguilera | B64C 21/10 |
| 2010/0054931 | A1 * | 3/2010 | Yoshida | F04D 19/024 |
| | | | | 415/199.5 |
| 2014/0093382 | A1 * | 4/2014 | Fuglsang | F03D 1/0641 |
| | | | | 416/236 R |
| 2017/0107971 | A1 * | 4/2017 | Singh | F03D 1/0675 |
| 2018/0119706 | A1 * | 5/2018 | Vogiatzis | F04D 29/325 |
| 2023/0132350 | A1 * | 4/2023 | Schneider | F04D 29/38 |
| | | | | 416/223 R |
| 2024/0318660 | A1 * | 9/2024 | Yao | F04D 19/002 |

FOREIGN PATENT DOCUMENTS

| | | |
|---|---|---|
| DE | 2102161 | 8/1972 |
| DE | 9013191 | 1/1992 |
| DE | 69907134 | 2/2004 |
| DE | 102005044294 | 4/2007 |
| DE | 102006023417 | 11/2007 |

(Continued)

OTHER PUBLICATIONS

Takahashi, et al., "Manufacturing method of Gas turbine," CPO, CN 107110025 A, Aug. 28, 2017 (Year: 2017).*

*Primary Examiner* — Nathaniel E Wiehe
*Assistant Examiner* — Joshua R Beebe
(74) *Attorney, Agent, or Firm* — Barnes & Thornburg

(57) ABSTRACT

A fan wheel with successive blades is provided. Noise generation is reduced in that the widths and thicknesses of at least one of the blades vary over its length. A fan that contains such a fan wheel is provided.

15 Claims, 5 Drawing Sheets

(56)                    References Cited

FOREIGN PATENT DOCUMENTS

Figure 1:
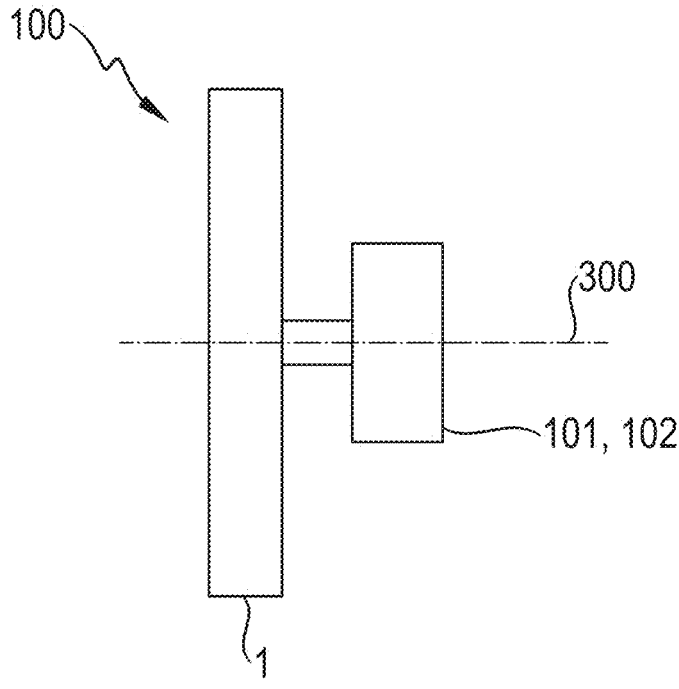

| | | | |
|---|---|---|---|
| DE | 60222905 | 7/2008 | |
| DE | 102018114896 | 12/2018 | |
| DE | 102018205300 | 10/2019 | |
| DE | 202019100367 | 4/2020 | |
| GB | 2507493 A * | 5/2014 | ........... F04D 29/245 |
| KR | 20140119488 A * | 10/2014 | ............ F04D 29/38 |
| WO | 2005026510 | 3/2005 | |
| WO | WO-2010104083 A1 * | 9/2010 | ........... F04D 29/283 |

* cited by examiner

FAN WHEEL

CROSS-REFERENCE TO RELATED APPLICATIONS

This application claims priority from German patent application No. DE 10 2024 127 886.2, filed on Sep. 26, 2024, the entirety of which is hereby incorporated by reference herein.

The present invention relates to a fan wheel with successive blades, specifically for a motor vehicle. The invention also relates to a fan that has such a fan wheel, in particular for an electric vehicle.

Fan wheels are used as parts of fans for numerous things, to generate airflows, e.g. for cooling purposes. This type of fan wheel rotates about an axis, and has successive blades over its circumference.

The blades are normally designed to generate as much airflow as possible.

The object of the present invention is to create a better, or at least different, design for a fan wheel of the above type and for a fan that contains such a fan wheel. In particular, the object of the invention is to create a design for the fan wheel and the fan that is less noisy.

This is achieved by the subject matter of the independent claims. Advantageous embodiments are the subject matter of the dependent claims.

The present invention is based on the idea of creating blades for a fan wheel in which the widths and thicknesses vary. The widths and thicknesses of the blades therefore differ over their lengths. Consequently, turbulence occurs where the blades are widest, while the different thicknesses of the blades reduce the noise generated by the turbulence. As a result, the fan wheel generates less noise when in use.

In accordance with the concept of the invention, the fan wheel, which rotates about an axis, has successive blades over its circumference. Each blade extends radially and has a thickness and width. At least one, preferably all, of the blades have different widths and thicknesses over their lengths.

The widths and thicknesses of the blades are defined by successive profile sections of the blades. These profile sections can be NACA airfoil profiles. Each profile section has a camber mean-line and a chord. The camber mean-line connects the centers of circles in the profile section. The chord is a straight line from the leading edge to the trailing edge of the profile section.

The width is the distance between the leading edge and trailing edge along the chord, or the length of the chord from the leading edge to the trailing edge.

The thickness is the diameter of the largest circle within the profile about a point on the camber mean-line.

These blades can be cambered in each profile section.

The fronts of the profiles of each blade define the leading edges of the blades. The rear edges of the profiles of each blade define the trailing edges of the blades.

In preferred embodiments, at least one of the blades has an evenly curved, e.g. concave, leading edge, while the shape of the trailing edge varies. This means that the variations in the width are due to the varying shape of the trailing edge. Because most of the turbulence occurs at the trailing edge when the fan is in use, this effectively reduces the noise that is generated.

The terms "varying" and "variation" refer in particular to differences in size in the present context. In other words, the thicknesses and widths of the blades differ at least once over their length.

The directions described above relate in particular to the axial rotational axis. "Axial" is therefore coaxial or parallel to the rotational axis. "Circumferential" encompasses the rotational axis. "Radial" is at a right angle to the rotational axis, and therefore at a right angle to "axial."

In theory, the thickness and width of the blade can vary arbitrarily over its length.

Embodiments in which the thickness and width of at least one of the blades, preferably all of the blades, increase and decrease conversely over its length, are preferred. This means that when the blade becomes thicker, it becomes narrower, and vice versa. In other words, the blade varies over its length between thin and thick, and wide and narrow. Consequently, when it becomes wider, it also becomes thinner. This effectively reduces turbulence. Consequently, the fan wheel runs more quietly.

In advantageous embodiments, the width of at least one of the blades increases and decreases successively over its length.

In advantageous embodiments, the width of at least one of the blades increases and decreases periodically over its length. This period relates specifically to the distance to the rotational axis. The blade is therefore wave-shaped when seen from above. This further reduces turbulence, and therefore the noise it generates.

Theoretically, the maximum widths of successive profile sections can be the same.

In advantageous embodiments, the relative width of at least one of the blades decreases over the length. The relative width is defined by the ratio of the width to the distance to the rotational axis in the profile section in question. This means that the width of the blade tends to decrease toward the outer end, i.e. the blade becomes narrower over its length. This further reduces the noise it generates.

Embodiments in which the average width of at least one of the blades varies are regarded as advantageous. The average width is also referred to below as the mean width.

The width preferably varies between −10% and +10% about the average width. This means that the narrowest width is at most 10% narrower than the average width, and the widest part is at most 10% wider than the average width. The width preferably varies between −4% and +4% about the average width. This prevents, or at least reduces, turbulence, further reducing the noise generated.

In preferred embodiments, the trailing edge of at least one of the blades has the shape of a sine wave when seen from above. This means that the trailing edge has no sharp corners when seen from above. This further reduces the noise it generates.

The thickness of at least one of the blades preferably increases and decreases successively over its length.

Embodiments in which the thickness of at least one of the blades increases and decreases periodically are considered advantageous. This period relates specifically to the distance to the rotational axis. This further reduces turbulence, and therefore the noise it generates.

The thickness of at least one of the blades advantageously varies about an average thickness. The average thickness is also referred to as the mean thickness.

The thickness preferably varies between −30% and +30% about the average thickness. This means that the thinnest section is no more than 30% thinner than the average thickness, and the thickest section is no more than 30% thicker than the average. The thickness preferably varies between −20% and +20% about the average thickness. This substantially prevents, or at least reduces, turbulence. The result is a further reduction in the generation of noise.

In preferred embodiments, at least one, preferably all, of the blades have at least four profile sections, between which the widths and thicknesses vary. This means that the widths and thicknesses increase and decrease at least three times.

At least one of the blades has between five and thirteen such profile sections, between which the widths and thicknesses vary.

The profile sections of the respective blades are preferably equidistant to one another. This results in a periodic variation in the thicknesses and widths. The result is an effective reduction in noise generation.

The camber of the respective blades can theoretically be arbitrary.

Embodiments in which the camber of at least one of the blades is between 5% and 20% of the width in at least one of the profile sections are considered advantageous. In particular, the camber is between 5% and 15% of the width of the profile section in question. This results in a further reduction in noise generation.

The blades of the fan wheel can conceivably be different from one another.

In advantageous embodiments, the blades of the fan wheel are identical. This simplifies production, while still reducing the noise generated therewith.

The fan wheel is ideally used in a fan to generate an airflow. The fan has a drive for this, e.g. an electric motor, which rotates the fan wheel about the rotational axis.

The fan wheel, in particular the fan, can be used for a number of things.

By way of example, the fan wheel and fan can be used in a temperature control apparatus for air-cooling a component or an object.

By way of example, the fan wheel/fan can be used in a vehicle, in particular an electric vehicle, to cool components, in particular as a temperature control apparatus in the vehicle.

It is understood that not only the fan wheel, but also the fan, belong to the scope of this invention.

Other important features and advantages of the invention can be derived from the dependent claims, the drawings, and the descriptions of the drawings.

It is understood that the features specified above and explained below can be used not only in the given combinations, but also in and of themselves, or in other combinations, without abandoning the scope of the present invention.

Preferred exemplary embodiments of the invention are illustrated in the drawings and shall be explained in greater detail below, in which the same reference symbols are used for identical, similar, or functionally identical components.

Figure 2:
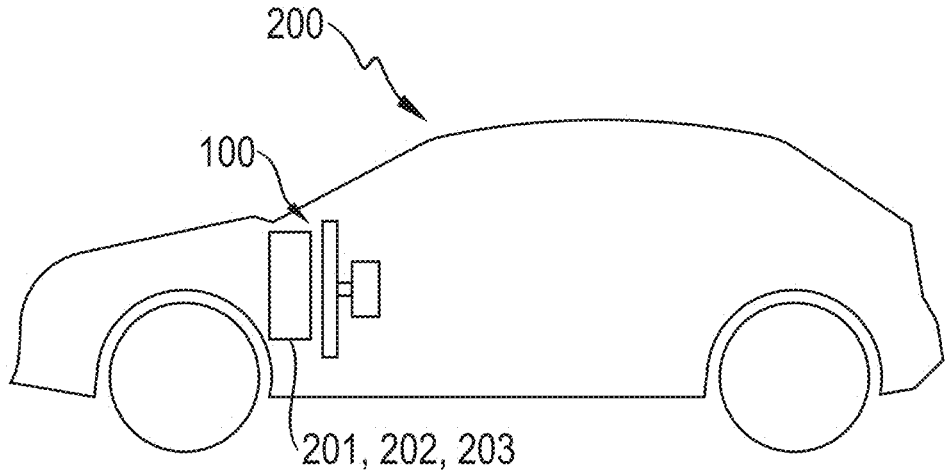
Figure 3:
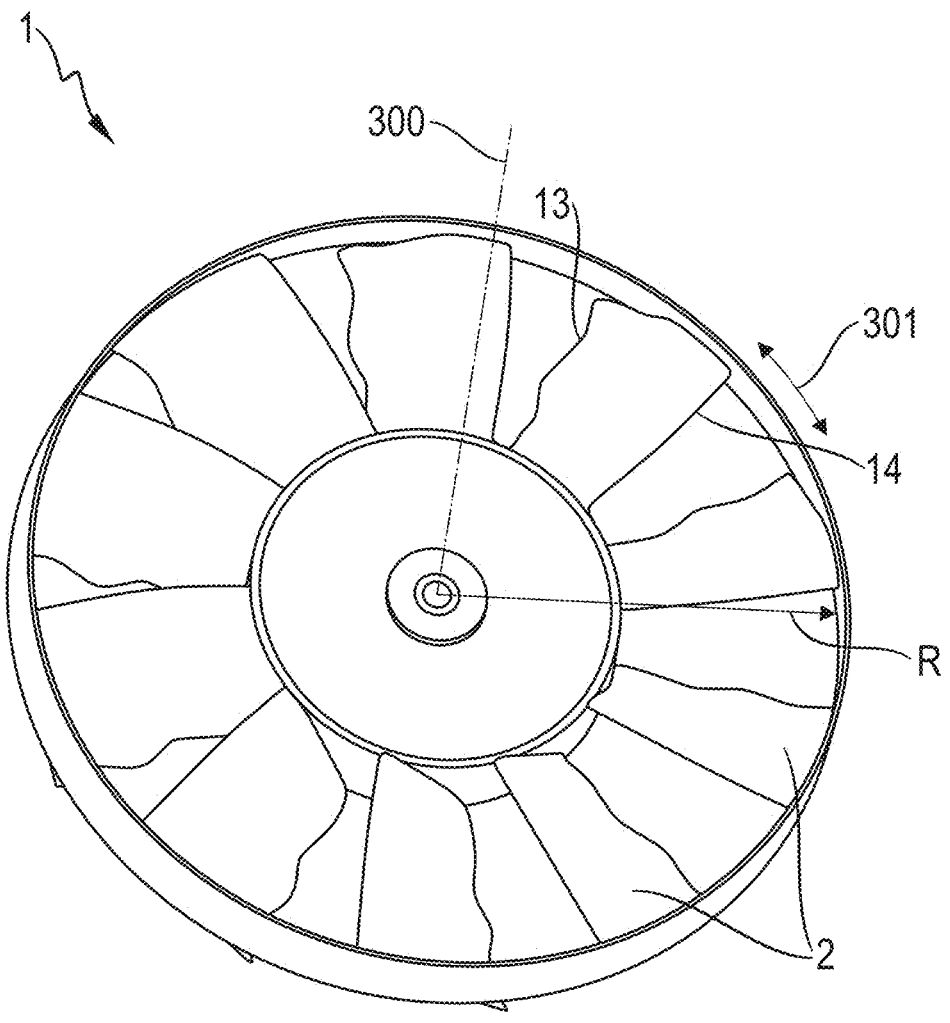
Figure 4:
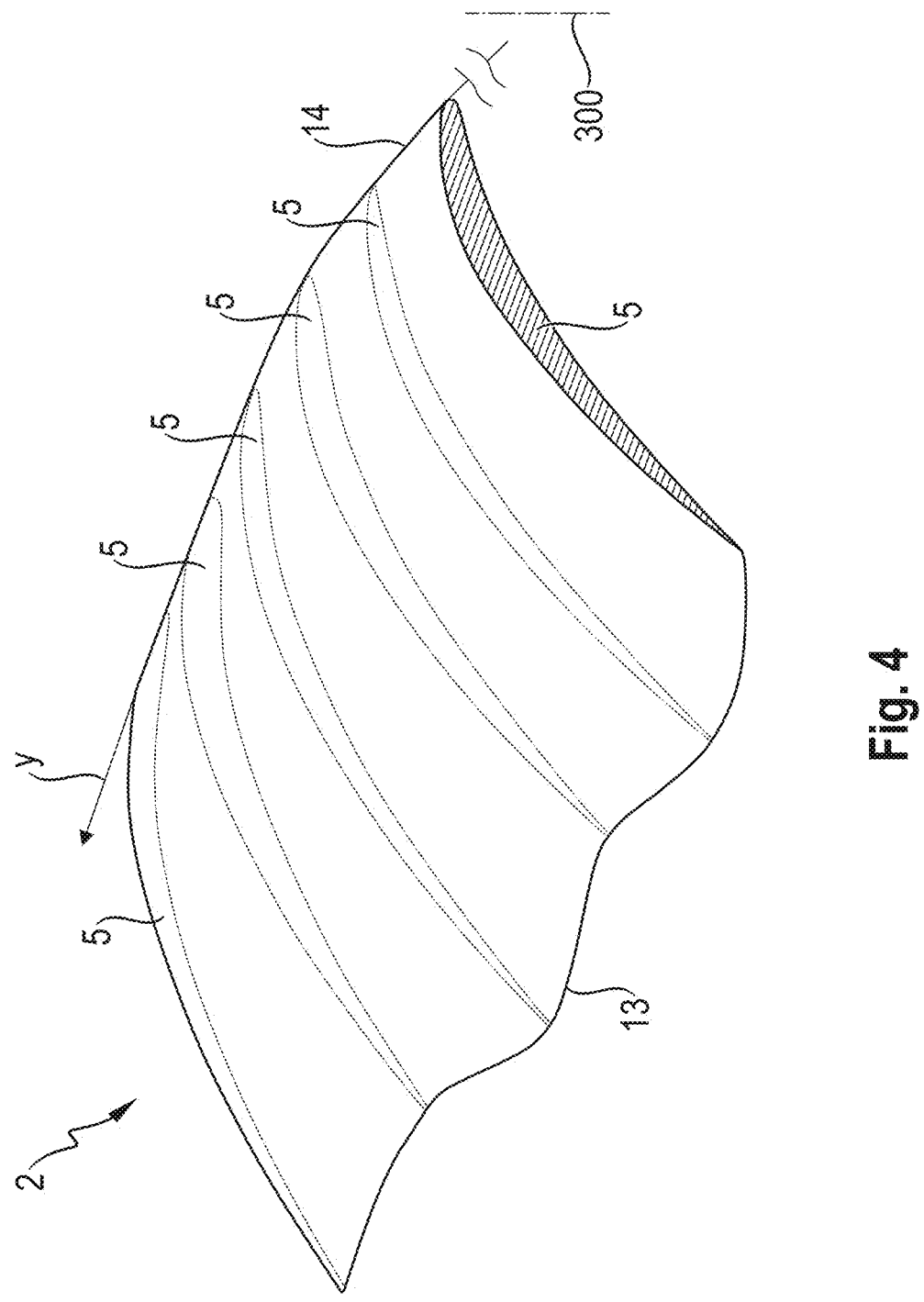
Figure 5:
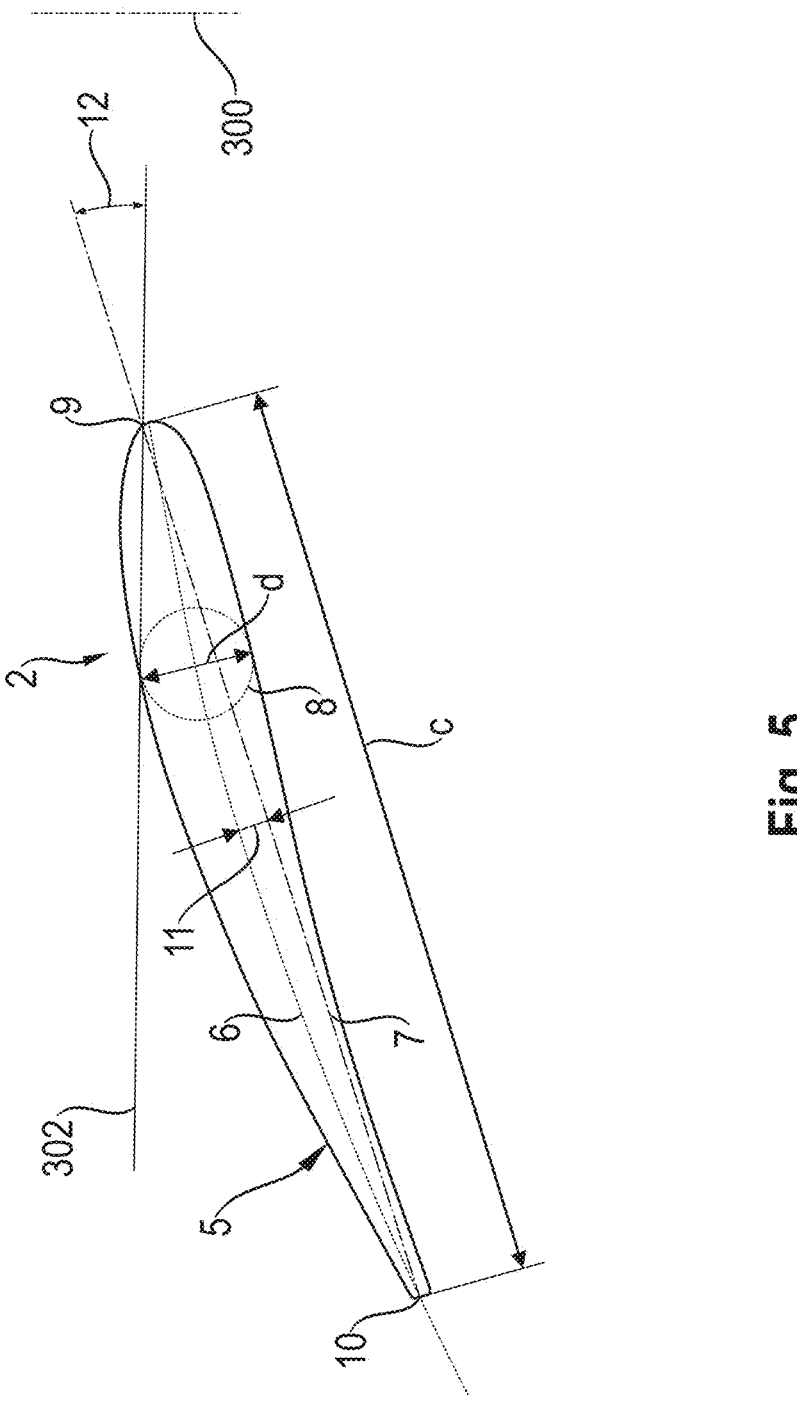
Figure 6:
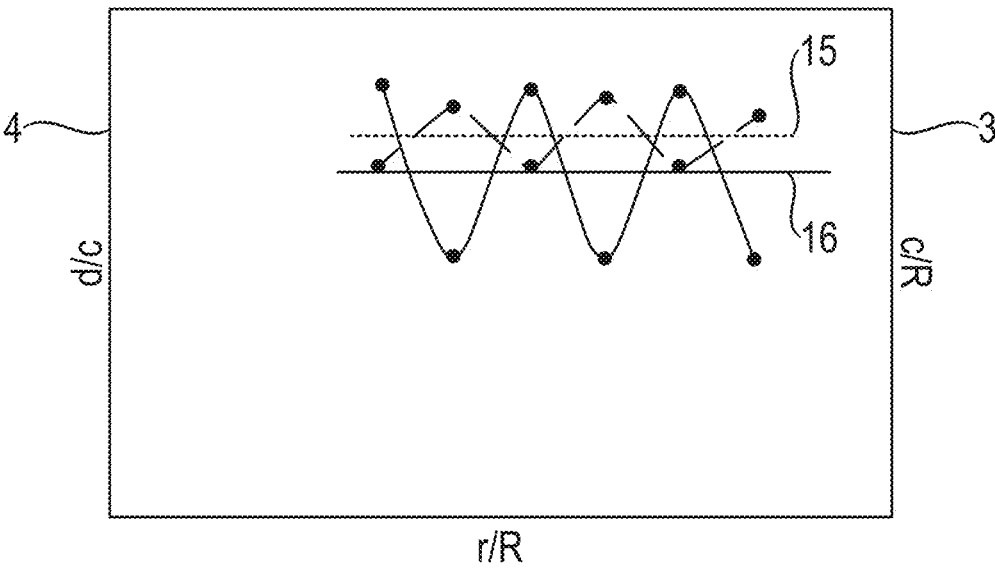
Figure 7:
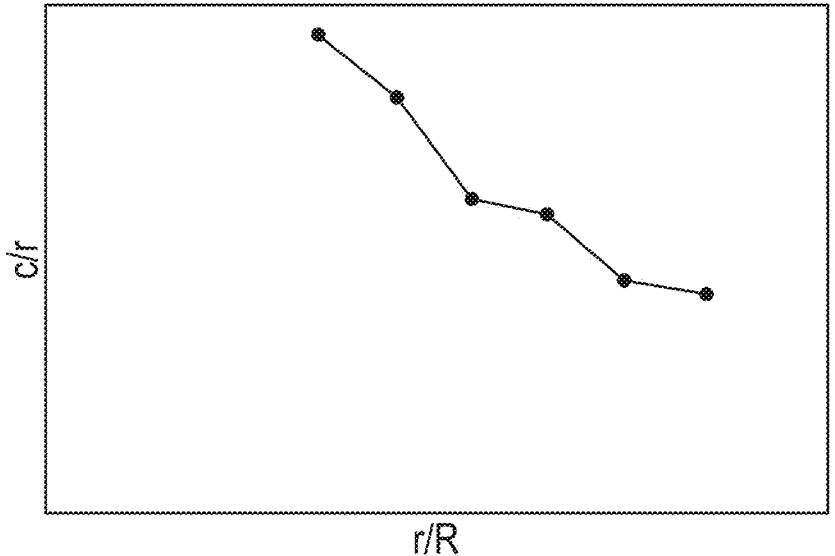

Therein, schematically:

FIG. 1 shows a highly simplified side view of a fan wheel in a fan,

FIG. 2 shows a highly simplified side view of the fan with the fan wheel in a vehicle, FIG. 3 shows an isometric view of the fan wheel, FIG. 4 shows an isometric sectional view of a blade from the fan wheel, FIG. 5 shows a profile section of the blade FIG. 6 shows a graph illustrating the variation in the thickness and width of a blade, and FIG. 7 shows a graph further illustrating the course of the width.

The fan wheel 1 shown by way of example in FIGS. 1 to 3 is used to generate an airflow. The fan wheel 1 is normally part of a fan 100, shown in FIGS. 1 and 2, which also has a drive 101, e.g. an electric motor 102, for powering the fan wheel 1. The fan wheel 1 and fan 100 can be used in a vehicle 200, as shown in FIG. 2, to cool a component 201 in the vehicle 200 with the airflow. The component 201 can be a heat exchanger 202, a drive 203 for the vehicle 200, etc. The vehicle 200 can be and electric vehicle.

When in use, the fan wheel 1 rotates about an axis 300 to generate airflow. As can be seen in particular in FIG. 3, the fan wheel 1 has successive blades 2 over its circumference 301. This direction relates to the axial rotational axis 300. The circumference 301 thus encircles the rotational axis 300. The "axial" direction is coaxial or parallel to the rotational axis 300, and "radial" is at a right angle to the rotational axis 300, and to the axial direction.

As shall be explained below, and can be seen in FIGS. 3 and 4, the width c and thickness d of at least one of the blades 2 vary over its length in the radial direction. In this exemplary embodiment, the blades 2 are identical.

The lengths c and thicknesses d of the blades 2 are defined by the successive profile sections 5 of the blades 2 over their lengths, shown in FIG. 4. Each profile section in these exemplary embodiments is a NACA airfoil profile. An example of such a profile section 5 is shown in FIG. 5. This profile section 5 has a camber mean-line 6 and a chord 7. The camber mean-line 6 connects the middles of circles 8 in the profile section 5, only one of which, the largest circle 8, is shown in FIG. 5. The chord 7 is a straight line from the leading edge 9 to the trailing edge 10 of the blade 2 in the profile section 5. The width c is the length of the chord 7 from the trailing edge 10 to the leading edge 9, or the distance between the leading edge 9 and the trailing edge 10 along the chord 7. This distance, and therefore the width c, varies over the length of the blade 2. The thickness d is the diameter of the largest circle 8 along the camber mean-line 6. This diameter, and thus the thickness d, varies over the length of the blade 2. The terms, "vary" and "variation," refer to at least one difference in the width c and thickness d.

As can be seen in FIG. 5, the profile section 5, and therefore the blade 2, also has a camber 11, which corresponds to the maximum distance between the camber mean-line 6 and the chord 7. The camber 11 can be between 5% and 20% of the width c in the respective profile section 5.

Each profile section 5, and therefore the blade 2 to which it belongs, can have a pitch 12, as shown in FIG. 5, which corresponds to the angle between the chord 7 and the plane 302 intersecting the rotational axis 300.

As FIG. 4 shows, each of the blades 2 has at least four successive profile sections 5 over its length, between which the widths c and thicknesses d vary. The sections 5 are equidistant to one another in these exemplary embodiments. Six such sections 5 are shown in these exemplary embodiments, purely by way of example. Each section 5 is therefore at a specific distance r to the rotational axis 300. This distance r is also referred to below as the local radius r for the profile section 5.

The trailing edges 10 of the respective blades 2 define a rear edge 13, and the leading edges 9 form the front edges 14 of the respective blades 2, as shown in FIG. 4 in particular. As FIGS. 3 to 5 show, the front edges 14 of the blades 2 have a substantially uniform curve, while the rear edges 13 vary over the length, to obtain the variation in width c.

FIG. 6 shows a graph in which a relative radius is plotted along the x-axis. This relative radius corresponds to the relationship of the local radius r to the radius R of the fan wheel 1 (see FIG. 3). A relative thickness is also plotted along the y-axis in the graph. The relative thickness corresponds to the relationship between the thickness d and the width c. The average width is also plotted along the y-axis on the right. The average width corresponds to relationship between the width c and the radius R of the fan wheel 1. The average width is indicated by a broken line and the relative thickness is indicated by a solid line in FIG. 6. The dots indicate the positions of the profile sections 5. Consequently, there are six dots in the graph, which correspond to the purely exemplary six profile sections 5 in the embodiment.

As FIGS. 4 and 6 show, the widths c and thicknesses d of the blades vary conversely to one another over the length of each blade 2. This means that when the thickness d increases, the width c decreases, and vice versa. Furthermore, the width c in these exemplary embodiments increases and decreases over the length of the blade, while the thickness d decreases and increases over the length. The variations in width c and thickness d are therefore periodic over the length of the blade. The changes in the width c, as FIG. 4 shows, follow the course of a sine wave along the rear edge 13.

FIG. 6 also shows that the width c varies about an average 15 indicated in FIG. 6, which is also referred to as the average width 15. This is the average of the relative widths c/R. In these exemplary embodiments, the width c varies between minus 10% and −10%, in particular between 4% and −4% about the average width 15.

As FIG. 6 also shows, the thickness d in these exemplary embodiments also varies about an average 16, also referred to as the thickness average 16. The thickness average is the average of the relative thicknesses d/c. The thickness d in these exemplary embodiments varies between −30% and 30%, in particular between −20% and 20% about the average thickness 16.

FIG. 7 shows a graph in which the relative radius is plotted along the x-axis. The relative width is plotted along the y-axis. The relative width is the relationship between the width c and the local radius r. FIG. 7 shows that the relative width decreases in these exemplary embodiments toward the outer end. This means that the relative width c/r of the blade 2 tends to decrease, despite any variations over the length.

Any turbulence occurring where the blades 2 have the greatest widths c are effectively reduced by the decreasing thicknesses d in these areas with the fan wheel 1 obtained with the invention. This reduces the noise generated when the fan wheel 1 is in use, while also increasing the airflow.

The specification can be readily understood with reference to the following numbered Paragraphs:

Numbered Paragraph 1. A fan wheel (1), specifically for a motor vehicle (200), wherein the fan wheel (1) rotates about an axis (300) when in use, which has successive blades (2) over its circumference (301), wherein the respective blades (2) extend radially over their length, and have a thickness (d) and width (c), wherein the widths (c) and thicknesses (d) of at least one of the blades (2) vary over the length of the blade (2).

Numbered Paragraph 2. The fan wheel according to Numbered Paragraph 1, characterized in that the thicknesses (d) and widths (c) of at least one of the blades (2) increase and decrease conversely over the length of the blade (2).

Numbered Paragraph 3. The fan wheel according to Numbered Paragraph 1 or 2, characterized in that the width (c) of at least one of the blades (2) increases and decreases successively over the length.

Numbered Paragraph 4. The fan wheel according to Numbered Paragraph 3, characterized in that the width (c) of at least one of the blades (2) increases and decreases periodically over the length.

Numbered Paragraph 5. The fan wheel according to any of the Numbered Paragraphs 1 to 4, characterized in that the relative width, defined by the relationship of the width (c) to a radial distance (r) to the rotational axis (300) of at least one of the blades (2) decreases toward the outer end.

Numbered Paragraph 6. The fan wheel according to any of the Numbered Paragraphs 1 to 5, characterized in that the width (c) of at least one of the blades (2) varies between −10% and 10% about the average width (15).

Numbered Paragraph 7. The fan wheel according to any of the Numbered Paragraphs 1 to 6, characterized in that a rear edge (13) formed by the trailing edge (10) of at least one of the blades (2) follows the course of a sine wave when viewed from above.

Numbered Paragraph 8. The fan wheel according to any of the Numbered Paragraphs 1 to 7, characterized in that the thickness (d) of at least one of the blades (2) decreases and increases successively over the length.

Numbered Paragraph 9. The fan wheel according to Numbered Paragraph 8, characterized in that the thickness (d) of at least one of the blades (2) decreases and increases periodically over the length.

Numbered Paragraph 10. The fan wheel according to any of the Numbered Paragraphs 1 to 9, characterized in that the thickness (d) of at least one of the blades (2) varies between −30% and 30% about the average thickness (16).

Numbered Paragraph 11. The fan wheel according to any of the Numbered Paragraphs 1 to 10, characterized in that at least one of the blades (2) has at least four profile sections (5), between which the widths (c) and thicknesses (d) vary.

Numbered Paragraph 12. The fan wheel according to Numbered Paragraph 11, characterized in that the profile sections (5) are equidistant to one another.

Numbered Paragraph 13. The fan wheel according to any of the Numbered Paragraphs 1 to 10, characterized in that the camber (11) in at least one of the blades (2) is between 5% and 20% of the width (c) of its profile section (5).

Numbered Paragraph 14. The fan wheel according to any of the Numbered Paragraphs 1 to 13, characterized in that the blades (2) are identical.

Numbered Paragraph 15. A fan (100), in particular for an electric vehicle (200), which has a fan wheel (1) according to any of the Numbered Paragraphs 1 to 14, and a drive (101) that rotates the fan wheel (1) about the rotational axis (300) when in use.

LIST OF REFERENCE SYMBOLS 1 fan wheel
2 blade
3 average width
4 average thickness
5 profile section
6 camber mean-line
7 chord
8 circle
9 leading edge
10 trailing edge
11 camber

12 pitch
13 rear edge
14 front edge
15 average width
16 average thickness
100 fan
101 drive
102 electric motor
200 motor vehicle
201 component
202 heat exchanger
203 drive component
300 rotational axis
301 circumference
302 plane
C width
d thickness
r local radius
R fan wheel radius

The invention claimed is:

1. A fan wheel, specifically for a motor vehicle, wherein the fan wheel rotates about an axis when in use, which has successive blades over its circumference, wherein the respective blades extend radially over their length, and have a thickness and width, wherein the widths and thicknesses of at least one of the blades vary over the length of the blade, wherein a leading edge formed by a front edge of at least one of the blades has a uniform curve, and wherein a rear edge formed by a trailing edge of at least one of the blades has a non-uniform curve over the length of the blade to obtain the variation in width over the length of the blade.

2. The fan wheel of claim 1, wherein the thicknesses and widths of at least one of the blades increase and decrease conversely over the length of the blade.

3. The fan wheel of claim 1, wherein the width of at least one of the blades increases and decreases successively over the length.

4. The fan wheel of claim 3, wherein the width of at least one of the blades increases and decreases periodically over the length.

5. The fan wheel of claim 1, wherein the relative width, defined by the relationship of the width to a radial distance (r) to the rotational axis of at least one of the blades decreases toward the outer end.

6. The fan wheel of claim 1, wherein the width of at least one of the blades varies between −10% and 10% about the average width.

7. The fan wheel of claim 1, wherein a rear edge formed by the trailing edge of at least one of the blades follows the course of a sine wave when viewed from a circumferential direction aligned with an axial direction and a radial direction of the blade.

8. The fan wheel of claim 1, wherein the thickness of at least one of the blades decreases and increases successively over the length.

9. The fan wheel of claim 8, wherein the thickness of at least one of the blades decreases and increases periodically over the length.

10. The fan wheel of claim 1, wherein the thickness of at least one of the blades varies between −30% and 30% about the average thickness.

11. The fan wheel of claim 1, wherein at least one of the blades has at least four profile sections, between which the widths and thicknesses vary.

12. The fan wheel of claim 11, wherein the profile sections are equidistant to one another.

13. The fan wheel of claim 1, wherein the camber in at least one of the blades is between 5% and 20% of the width of its profile section.

14. The fan wheel of claim 1, wherein the blades are identical.

15. A fan for an electric vehicle, comprising a fan wheel of claim 1, and further comprising a drive that rotates the fan wheel about the rotational axis when in use.

\* \* \* \* \*